(12) United States Patent　　　　　(10) Patent No.:　US 12,625,866 B2
Coze et al.　　　　　　　　　　　　(45) Date of Patent:　　May 12, 2026

(54) SYSTEM TO DETERMINE TUPLE VALUES

(71) Applicant: SAP SE, Walldorf (DE)

(72) Inventors: Stephane Coze, Conflans Sainte
Honorine (FR); Jerome Guerin, Alès
(FR); Laurent Le Floch,
Magny-en-Vexin (FR)

(73) Assignee: SAP SE, Walldorf (DE)

( * ) Notice: Subject to any disclaimer, the term of this
patent is extended or adjusted under 35
U.S.C. 154(b) by 157 days.

(21) Appl. No.: 18/433,791

(22) Filed: Feb. 6, 2024

(65) Prior Publication Data

US 2025/0252093 A1　　Aug. 7, 2025

(51) Int. Cl.
G06F 16/00　　　(2019.01)
G06F 16/242　　(2019.01)
G06F 16/248　　(2019.01)
(52) U.S. Cl.
CPC ........ G06F 16/2425 (2019.01); G06F 16/248
(2019.01)
(58) Field of Classification Search
CPC ............................ G06F 16/2425; G06F 16/248
See application file for complete search history.

(56) References Cited

U.S. PATENT DOCUMENTS

| | | | |
|---|---|---|---|
| 2007/0168323 A1* | 7/2007 | Dickerman | ............. G06F 40/18 |
| 2018/0285480 A1* | 10/2018 | Standefer, III | ...... G06F 16/9038 |
| 2020/0167313 A1* | 5/2020 | Isoda | .................... G06F 16/144 |
| 2021/0081434 A1* | 3/2021 | Dombroski | ........... G06F 16/282 |

* cited by examiner

*Primary Examiner* — Dinku W Gebresenbet
(74) *Attorney, Agent, or Firm* — Buckley, Maschoff &
Talwalkar LLC

(57)　　　　　ABSTRACT

Systems and methods include receipt of a request for stored
values associated with a plurality of tuples including a
plurality of dimension members; transmission of a first
query including all dimension members of each of the
plurality of tuples, reception from the system of a first result
set including a value associated with each of a plurality of
first result tuples, determination of a remaining set of tuples
based on the plurality of tuples and the plurality of first result
tuples, transmission of a second query including dimension
members of the remaining set of tuples, reception of a
second result set including a value associated with each of
a plurality of second result tuples, determination, based on
the second result set, that the values associated with the
plurality of tuples have been received, and presentation of
the values associated with the plurality of tuples.

20 Claims, 11 Drawing Sheets

100

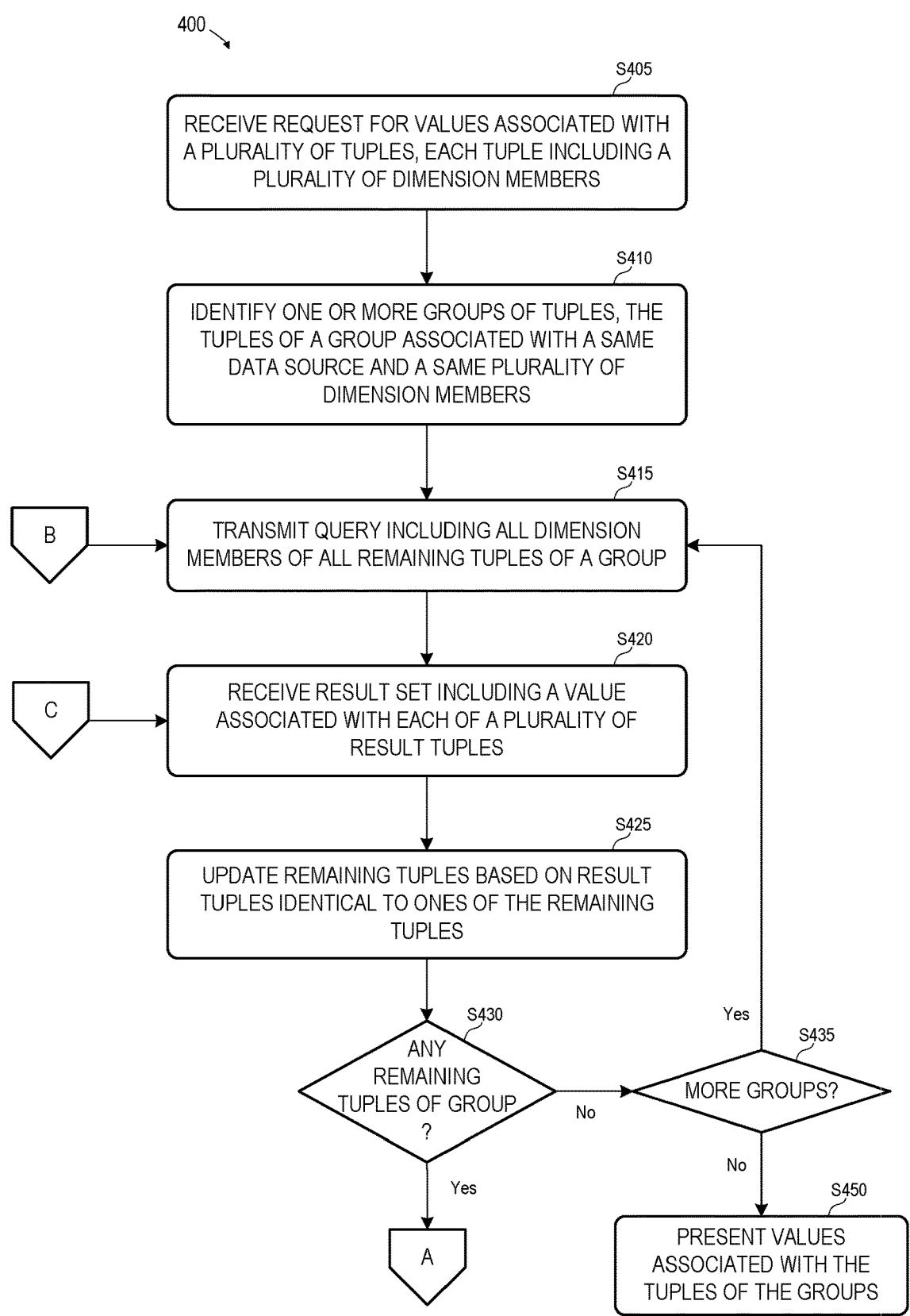

400

S405

RECEIVE REQUEST FOR VALUES ASSOCIATED WITH A PLURALITY OF TUPLES, EACH TUPLE INCLUDING A PLURALITY OF DIMENSION MEMBERS

S410

IDENTIFY ONE OR MORE GROUPS OF TUPLES, THE TUPLES OF A GROUP ASSOCIATED WITH A SAME DATA SOURCE AND A SAME PLURALITY OF DIMENSION MEMBERS

S415

B

TRANSMIT QUERY INCLUDING ALL DIMENSION MEMBERS OF ALL REMAINING TUPLES OF A GROUP

S420

C

RECEIVE RESULT SET INCLUDING A VALUE ASSOCIATED WITH EACH OF A PLURALITY OF RESULT TUPLES

S425

UPDATE REMAINING TUPLES BASED ON RESULT TUPLES IDENTICAL TO ONES OF THE REMAINING TUPLES

S430

ANY REMAINING TUPLES OF GROUP?

No

Yes

S435

MORE GROUPS?

No

Yes

A

S450

PRESENT VALUES ASSOCIATED WITH THE TUPLES OF THE GROUPS

ANY
REMAINING TUPLES OF
FIXED MEMBER OF PIVOT
DIMENSION
?

B

No

Yes

S445

TRANSMIT QUERY INCLUDING FIXED MEMBER OF
PIVOT DIMENSION, DIMENSION MEMBERS OF OTHER
HIERARCHICAL DIMENSIONS OF REMAINING TUPLES
INCLUDING FIXED MEMBER AND ALL DIMENSION
MEMBERS OF NON-HIERARCHICAL DIMENSIONS OF
THE REMAINING TUPLES

C

500

| Dimension A | Dimension B | Dimension C | Value |
|---|---|---|---|
| DAM1 | DBM2 | DCM1 | 10 |
| DAM121 | DBM11 | DCM1 | 20 |
| DAM21 | DBM2 | DCM1 | 30 |
| DAM3 | DBM32 | DCM1 | 40 |
| DAM3111 | DBM1 | DCM1 | 50 |
| DAM1 | DBM32 | DCM1 | 60 |
| DAM121 | DBM3 | DCM1 | 70 |
| DAM3 | DBM2 | DCM1 | 80 |
| DAM1 | DBM11 | DCM1 | 90 |
| DAM121 | DBM11 | DCM2 | 100 |
| DAM21 | DBM32 | DCM3 | 110 |
| DAM3 | DBM32 | DCM2 | 120 |
| DAM311 | DBM1 | DCM3 | 130 |
| DAM1 | DBM32 | DCM3 | 140 |
| DAM121 | DBM3 | DCM3 | 150 |
| DAM1 | DBM1 | DCM3 | 160 |

| Dimension A | Dimension B | Dimension C | |
|---|---|---|---|
| DAM1 | DBM1 | DCM3 | 601 |
| DAM1 | DBM11 | DCM1 | 602 |
| DAM21 | DBM2 | DCM1 | 603 |
| DAM21 | DBM32 | DCM3 | 604 |
| DAM3111 | DBM1 | DCM1 | 605 |

*FIG. 6*

| Query1 | Dimension A | Dimension B | Dimension C | |
|---|---|---|---|---|
| | DAM1, DAM21, DAM3111 | DBM1, DBM11, DBM2, DBM32 | DCM3, DCM1 | |

| Result1 | Dimension A | Dimension B | Dimension C | Value |
|---|---|---|---|---|
| | DAM1 | DBM2 | DCM1 | 10 |
| | DAM1 | DBM1 | DCM3 | 160 |

| Remaining Tuples | Dimension A | Dimension B | Dimension C | |
|---|---|---|---|---|
| | DAM1 | DBM11 | DCM1 | ⌐602 |
| | DAM21 | DBM2 | DCM1 | ⌐603 |
| | DAM21 | DBM32 | DCM3 | ⌐604 |
| | DAM3111 | DBM1 | DCM1 | ⌐605 |

*FIG. 7*

| Query2 | Dimension A | Dimension B | Dimension C | |
|---|---|---|---|---|
| | DAM1 | DBM11 | DCM3, DCM1 | |

| Result2 | Dimension A | Dimension B | Dimension C | Value |
|---|---|---|---|---|
| | DAM1 | DBM11 | DCM1 | 90 |

| Remaining Tuples | Dimension A | Dimension B | Dimension C | |
|---|---|---|---|---|
| | DAM21 | DBM2 | DCM1 | ⌐603 |
| | DAM21 | DBM32 | DCM3 | ⌐604 |
| | DAM3111 | DBM1 | DCM1 | ⌐605 |

*FIG. 8*

| Query3 | Dimension A | Dimension B | Dimension C | |
|---|---|---|---|---|
| | DAM21, DAM3111 | DBM2, DBM32, DBM1 | DCM3, DCM1 | |

| Result3 | Dimension A | Dimension B | Dimension C | Value |
|---|---|---|---|---|
| | DAM21 | DBM2 | DCM1 | 30 |

| Remaining Tuples | Dimension A | Dimension B | Dimension C | |
|---|---|---|---|---|
| | DAM21 | DBM32 | DCM3 | 604 |
| | DAM3111 | DBM1 | DCM1 | 605 |

FIG. 9

| Query4 | Dimension A | Dimension B | Dimension C | |
|---|---|---|---|---|
| | DAM21 | DBM32 | DCM3, DCM1 | |

| Result4 | Dimension A | Dimension B | Dimension C | Value |
|---|---|---|---|---|
| | DAM21 | DBM32 | DCM3 | 110 |

| Remaining Tuples | Dimension A | Dimension B | Dimension C | |
|---|---|---|---|---|
| | DAM3111 | DBM1 | DCM1 | 605 |

FIG. 10

| Query5 | Dimension A | Dimension B | Dimension C | |
|---|---|---|---|---|
| | DAM3111 | DBM1 | DCM1 | |

| Result5 | Dimension A | Dimension B | Dimension C | Value |
|---|---|---|---|---|
| | DAM3111 | DBM1 | DCM1 | 50 |

| Remaining Tuples | Dimension A | Dimension B | Dimension C | |
|---|---|---|---|---|

*FIG. 11*

SYSTEM TO DETERMINE TUPLE VALUES

BACKGROUND

Modern enterprises produce, use and store large amounts of numerical data. The data may be stored in database tables, files or other data structures. Users interact with applications executing on servers (e.g., on-premise or cloud-based) to view, create and update the data. Interactions between the applications and the data are facilitated by metadata which describes the semantics of the data.

Applications may provide reports which present the stored data. A user requests a report by providing one or more dimensions (Country, Year, Product) and a measure (e.g., Sales) and by running a query on a data source based on the dimensions and measure. The dimensions and measure may be subject to query filters as is known in the art.

A user often desires to obtain data associated with specific combinations, or tuples, of dimension members (e.g., U.S.A., 2020, Shoes). To obtain this data, current systems either generate a report and filter the report based on the dimension members or, if capable, execute a separate filtered query for each tuple. The processing power and time required to obtain the desired data quickly becomes unsuitable as the number of tuples under consideration increases.

The problem is exacerbated in the case of hierarchical dimensions. A client application may be unaware of the levels of the hierarchy, the parent and/or children of specific dimension members, etc. Moreover, a client application may be unable to provide specific members of a hierarchical dimension at different levels without querying all members of these levels. Systems are desired to efficiently determine values associated with tuples in view of the shortcomings of existing systems.

BRIEF DESCRIPTION OF THE DRAWINGS

FIGS. 4A and 4B comprise a flow diagram of a process to efficiently determine values associated with a plurality of tuples of dimensions members according to some embodiments.

FIG. 5 is a tabular representation of a portion of a database table according to some embodiments.

FIG. 6 is a tabular representation of a plurality of tuples of dimensions members according to some embodiments.

FIG. 7 illustrates a query, a query result, and a list of remaining tuples according to some embodiments.

FIG. 8 illustrates a query, a query result, and a list of remaining tuples according to some embodiments.

FIG. 9 illustrates a query, a query result, and a list of remaining tuples according to some embodiments.

FIG. 10 illustrates a query, a query result, and a list of remaining tuples according to some embodiments.

FIG. 11 illustrates a query, a query result, and a list of remaining tuples according to some embodiments.

DETAILED DESCRIPTION

The following description is provided to enable any person in the art to make and use the described embodiments. Various modifications, however, will remain readily-apparent to those in the art.

Some embodiments provide efficient determination of requested values associated with dimension member tuples. Briefly, a data source is queried to generate a small intermediate report which returns some of the requested values as well as other values associated with other tuples. Another query is generated based on the returned requested values and the process repeats until all requested values are returned. The queries are generated to limit the size of the intermediate reports and thereby decrease response time, and also to limit the number of unwanted values to facilitate the processing of the returned reports.

Figure 1:
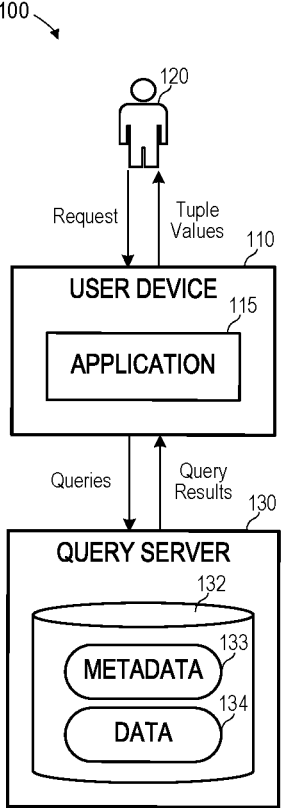
FIG. 1 is a block diagram of a system to efficiently determine values associated with a plurality of tuples of dimensions members according to some embodiments.

FIG. 1 is a block diagram of system 100 to efficiently determine values associated with a plurality of tuples of dimensions members according to some embodiments. System 100 is a logical diagram and may be implemented using any suitable combination of computing hardware and/or executable program code that is or becomes known. Such combinations may include one or more programmable processing units (microprocessors, central processing units, microprocessor cores, execution threads), local or remote non-transitory volatile and/or non-volatile electronic memory media (e.g., magnetic media, optical media, random access memory (RAM), read-only memory (ROM), removable media, or any other suitable memory), and executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/or any other metric.

User device 110 may comprise any computing device (e.g., a desktop computer, a laptop computer, a smartphone) operable by user 120 to communicate with query server 130. User device 110 may comprise application 115 consisting of program code executable to request content from query server 130 and to present content to user 120. Application 115 may comprise a Web browser, a standalone (i.e., desktop) application, or a client-side version of one or more server applications running on an application server (not shown) disposed between user device 110 and query server 130.

Query server 130 may comprise any suitable monolithic, distributed, on-premise and/or cloud-based computing platform. Query server 130 may execute program code of a database management system to receive queries from user device 110 or from an intermediary application server and provide corresponding results. Server 130 includes data store 132 which may consist of any type of standalone or distributed data storage systems that are or become known.

Data store 132 stores metadata 133 and data 134 as is known in the art. Metadata 133 may include database table names, table column names (e.g., Address, Sales) and a data schema defining dimensions, measures, mappings thereof to database tables, and logical relationships between database tables. As is known in the art, one or more dimensions of the schema may comprise a hierarchical dimension which itself consists of a hierarchical tree of dimensions.

Data 134 may store specific instances of the dimensions (i.e., dimension members) and measures (i.e., values) defined in metadata 133. In one simple example, data 134 may comprise a database table in which each row includes a dimension member of the dimension Country, a dimension member of the dimension Product, and a value of the measure Sales. Accordingly, a query of the database table including a particular country and product (e.g., France, Shoes) may return the value of the row including the dimension members France and Shoes.

Data 134 may include data of multiple tenants as is known in the art. Query server 130 may be configured to return only data of the tenant associated with requesting user 120. Tenant-specific data may be identified within data 134 using tenant-specific indices. In some embodiments, application 115 is a multi-tenant application which leverages such tenant-specific indices within its queries of query server 130. Embodiments may be implemented in other multi-tenant architectures.

According to some embodiments, application 115 is a spreadsheet application for viewing and analyzing data as is known in the art. Application 115 may, for example, comprise a mobile application (in which case user device 110 may comprise a smartphone), a desktop application, or a cloud-based application (in which case a browser of user device 110 may execute a client-side application in conjunction with a cloud-based server application). In the latter example, user device 110 may provide credentials to the cloud-based server application for access thereto as is known in the art.

Figure 2:
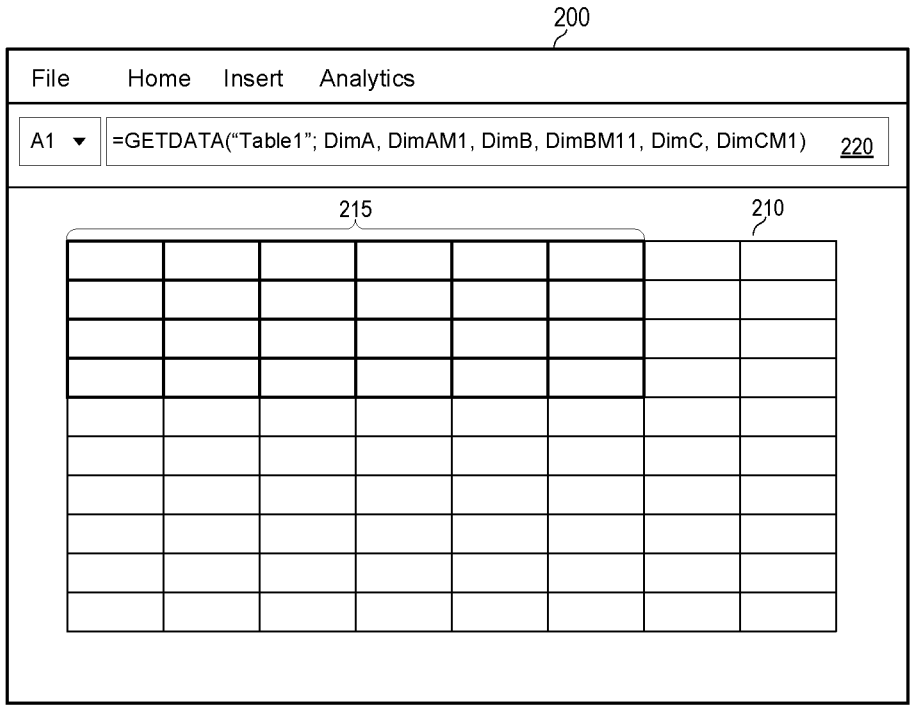
FIG. 2 is a view of an interface for requesting values associated with a plurality of tuples of dimensions members according to some embodiments.

FIG. 2 illustrates interface 200 of a spreadsheet application according to some embodiments. Interface 200 includes worksheet 210 and input area 220. Cell A1 is populated with the formula "=GETDATA("Table1"; DimA, DimAM1, DimB, DimBM11, DimC, DimCM1)". The formula is intended to represent a value of the data source Table1 which is associated with dimension member DimAM1 of dimension DimA, dimension member DimBM11 of dimension DimB, and dimension member DimCM1 of dimension DimC. In other words, the formula requests a value of Table1 associated with the tuple {DimAM1, DimBM11, DimCM1}. Embodiments are not limited to the formula name "GETDATA" or to any of the particular syntax represented in by the depicted formula.

Figure 3:
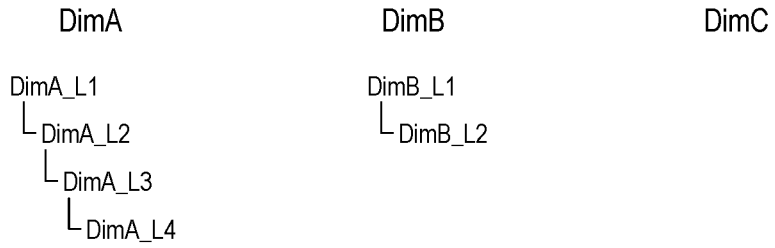
FIG. 3 illustrates dimension hierarchies of hierarchical dimensions according to some embodiments.

According to the present example, DimA and DimB are hierarchical dimensions. A hierarchical dimension describes a hierarchy of dimensions, such that each dimension in the hierarchy is associated with a parent dimension (except the highest-level "root" dimension) and zero or more child dimensions. FIG. 3 illustrates dimension hierarchies of hierarchical dimensions DimA and DimB according to some embodiments.

The highest-level dimension of hierarchical dimension DimA is denoted DimA_L1. Dimension DimA_L2 is a child dimension of dimension DimA_L1 and a parent dimension of dimension DimA_L3. Similarly, Dimension DimA_L3 is a child dimension of dimension DimA_L2 and a parent dimension of lowest-level dimension DimA_L4. In one example, DimA may be a Geography hierarchical dimension, with dimension DimA_L1 being a Continent dimension, dimension DimA_L2 being a Country dimension, dimension DimA_L3 being a State dimension, dimension DimA_L4 being a City dimension.

Hierarchical dimension DimB includes two dimensions, DimB_L1 and DimB_L2. As shown, dimension DimB_L1 is a parent dimension of dimension DimB_L2. An example of hierarchical dimension DimB is a Date dimension including Year dimension DimB_L1 and Month dimension DimB_L2. In the present example, dimension DimC is a non-hierarchical dimension, e.g., a Color dimension.

Dimension member DimAM1 of FIG. 2 is a member of a first-level dimension of DimA, dimension member DimBM11 is a member of a second-level dimension of DimA, and dimension member DimCM1 is a member of dimension DimC. According to the above examples, dimension member DimAM1 may be Asia, dimension member DimBM11 may be July, and dimension member DimCM1 may be Shoes. Embodiments may operate on tuples including one or more hierarchical dimensions and zero or more non-hierarchical dimensions.

It will be assumed that each of cells 215 of worksheet 210 includes a formula requesting a value associated with a tuple of dimension members. Some of the formulas may specify the same data sources and the same dimensions, some of the formulas may specify the same data sources and different dimensions, and/or some of the formulas may specify different data sources and the different dimensions. According to some embodiments, a user may interact with interface 200 to input a "Refresh All" command which requests the values associated with each tuple of cells 215.

Figure 4B:
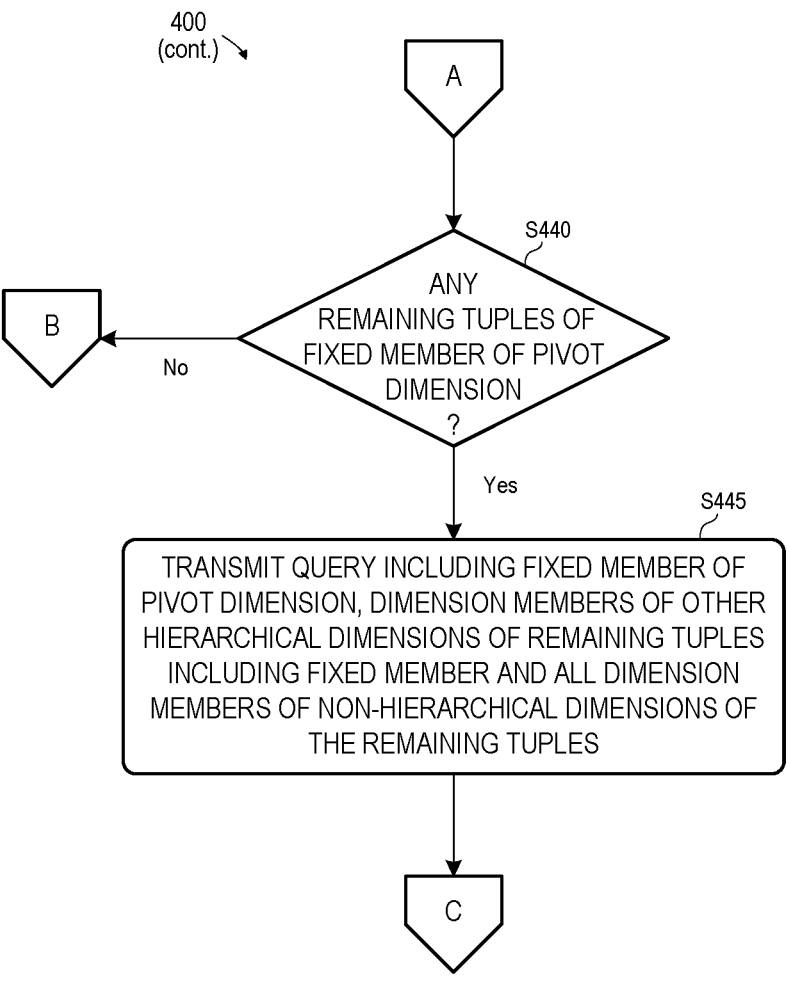

FIGS. 4A and 4B comprise a flow diagram of process 400 to efficiently determine values associated with a plurality of tuples of dimensions members according to some embodiments. Process 400 and the other processes described herein may be performed using any suitable combination of hardware and program code. Embodiments are not limited to the examples described below.

Initially, at S405, a request is received for values associated with a plurality of tuples, where each tuple includes a plurality of dimension members. According to some embodiments, at least one dimension member of each tuple is associated with a hierarchical dimension.

As described above, the request may be received a "Refresh all" command received by application 115 from user 120. Interface 200 may provide a ribbon button selectable to refresh all "GETDATA" formulas of a worksheet, and perhaps a second ribbon button selectable to refresh all "GETDATA" formulas of a workbook. The received request may comprise a list of individual requests, each of which specifies a data source and a tuple of dimension members.

At S410, one or more groups of tuples are identified from the plurality of tuples. Each tuple of a group of identified tuples is associated with the same data source and a same plurality of dimension members. Accordingly, each group of tuples is associated with a data source and/or a plurality of dimensions which is/are different than that/those associated with each other group.

FIG. 5 is a tabular representation of a portion of example database table 500 according to some embodiments. Database table 500 is a data source according to some embodiments. Each row of database table 500 specifies a dimension member of Dimension A, a dimension member of Dimension B, and a dimension member of Dimension C, and a value associated with the dimension member tuple of the row.

FIG. 6 is a tabular representation of a plurality of dimension member tuples 600 according to some embodiments. Tuples 600 are assumed to have been received with the request at S405. Each of tuples 600 is assumed to be associated with the same data source (i.e., table 500) and, as shown, with the same set of dimensions. Accordingly, tuples 600 are identified at S415 as belonging to the same group.

It should be noted that tuples belonging to one or more other groups may have also been received at S405.

A query is transmitted at S415. The query may be transmitted from application 115 to query server 130 in some embodiments. The query includes all dimension members of all tuples of one of the identified groups.

FIG. 7 illustrates the dimension members of a first query (i.e., Query1) transmitted at S415 based on the group of tuples 600. Query1 includes all nine dimension members of tuples 600, including three dimension members of Dimension A, four dimension members of Dimension B and two dimension members of Dimension C. As shown, each of the dimension members of Dimension A is associated with a different hierarchical level, and the dimension members of Dimension B are associated with three different hierarchical levels.

A result set is received at S420 in response to the query. The result set includes a value associated with each of a plurality of tuples, which will be referred to herein as result set tuples. As shown by Result1 of FIG. 7, a query selecting several dimension members of a hierarchical dimension with a default exploration level of 0 will return values only for result set tuples which include dimension members associated with the highest hierarchical level of the selected dimensions. Specifically, Query1 returns a value for the result tuple {DAM1, DBM2, DCM1} but no value for the tuple {DAM1, DBM11, DCM1} because DBM2 is associated with a higher hierarchical level than DBM11. Similarly, no value is returned for the tuple {DAM21, DBM2, DCM1} because DAM1 is associated with a higher hierarchical level than DAM21.

At S425, the result tuples which are identical to tuples of the group are identified. Since values have been acquired for such identified tuples of the group, the group is culled to remove the identified tuples, resulting in a set of remaining tuples. FIG. 7 shows remaining tuples determined at S425 according to the present example. The result set tuple {DAM1, DBM1, DCM3} is identical to tuple 601 of tuples 600, but the result set tuple {DAM1, DBM2, DCM1} is not within tuples 600. Accordingly, the remaining tuples consist of tuples 602-605 of tuples 600.

It is determined at S430 whether any remaining tuples exist. If so, flow proceeds from S430 to S440.

Application 115 may have no knowledge of the hierarchical structure of any of the hierarchical dimensions of the query. Moreover, application 115 may transmit the query via an API which does not return lower-level dimension members if higher-level dimension members are specified in the query. So, to ensure that all tuples of a group are properly queried, process 400 explores each requested dimension member of each dimension of the group.

For example, a hierarchical dimension is selected as a pivot and a dimension member of the pivot is fixed. In the present example, dimension A is the pivot and dimension member DAM1 is fixed since it is a dimension member of a tuple of Result1. At S440, it is determined whether any of the remaining tuples include the fixed member of the pivot dimension. Flow proceeds to S445 because remaining tuple 602 includes the fixed member (i.e., dimension member DAM1) of the pivot dimension.

A next query is transmitted at S445. The query includes the fixed member of the pivot dimension, dimension members of other hierarchical dimensions of the remaining tuples including the fixed member and all dimension members of non-hierarchical dimensions of the remaining tuples.

Query2 of FIG. 8 is the next query transmitted at S445 according to the present example. Remaining tuple 602 is the only remaining tuple including fixed dimension member DAM1. Accordingly, Query2 includes fixed member DAM1 of the pivot dimension, dimension member DBM11 (i.e., the only dimension member of the other hierarchical dimensions of the remaining tuples including the fixed member) and dimension members DCM3, DCM1) (i.e., all dimension members of the non-hierarchical dimension of the remaining tuples).

Flow returns to S420 to receive a result set and to update the remaining tuples based on result tuples which are identical to ones of the remaining tuples. The result tuple of Result2 is identical to tuple 602, so the remaining tuples are updated to include only tuples 603-605. Flow proceeds from S430 to S440 due to the existence of remaining tuples 603-605.

At S440, it is determined that none of the remaining tuples include the fixed member DAM1 of the pivot dimension. Accordingly, flow proceeds to S415 to transmit a query includes all dimension members of all the remaining tuples of the current group. Query3 of FIG. 9 is such a query, including all the dimension members of remaining tuples 603-605. Result3 received at S420 includes a single result tuple which is identical to remaining tuple 603, causing the remaining tuples to be updated at S425 to include tuples 604 and 605.

Flow proceeds through S430 and to S440, where it is determined that remaining tuple 604 includes new fixed member DAM21 of pivot dimension Dimension A.

Accordingly, Query4 of FIG. 10 is transmitted at S445, including fixed member DAM21 of the pivot dimension, dimension member DBM32 of the other hierarchical dimension of remaining tuple 604 including the fixed member DAM21, and all dimension members DCM3, DCM1 of the non-hierarchical dimension Dimension C of remaining tuples 604 and 605.

Flow returns to S420 to receive Result4 and to update remaining tuples 604 and 605 to remove identical tuple 604. Flow proceeds through S430 and to S440 with new fixed member DAM3111 of pivot dimension Dimension A of remaining tuple 605. Query5 of FIG. 11 is transmitted at S445, including fixed member DAM3111 of the pivot dimension, dimension member DBM1 of the other hierarchical dimension of remaining tuple 605 which includes the fixed member DAM3111, and dimension member DCM1 of the non-hierarchical dimension Dimension C of remaining tuple 605.

Result5 is returned at S420, and the remaining tuples are updated at S425. Since the result tuple of Result5 is identical to sole remaining tuple 605, it is determined at S430 that no tuples of the current group remain. Flow therefore proceeds to S435 to determine whether more identified groups of tuples exist. If so, flow returns to S415 and proceeds as described above to determine a value associated with each tuple of a next group of tuples. The next group of tuples may be associated with a different data source than the current group, in which case the queries transmitted at S415 and S445 should identify the different data source.

Flow proceeds to S450 once it is determined at S435 that all groups of tuples have been processed. At S450, the values associated with the tuples of the groups are presented. For example, each cell of cells 215 of interface 200 may be populated with the value associated with the data source and dimension member tuples specified by the formula associated with the cell.

According to some embodiments, the query transmitted at S445 may include up to two fixed members of a pivot dimension, where each of the fixed members is located on a different hierarchical level of the pivot dimension. In some scenarios, this alternative provides a suitable compromise between data volume and response time.

Other embodiments may allow an administrator to customize the number of levels to explore per dimension for each data source. Such customization may provide optimization of the above-described queries for various data sources.

Figure 12:
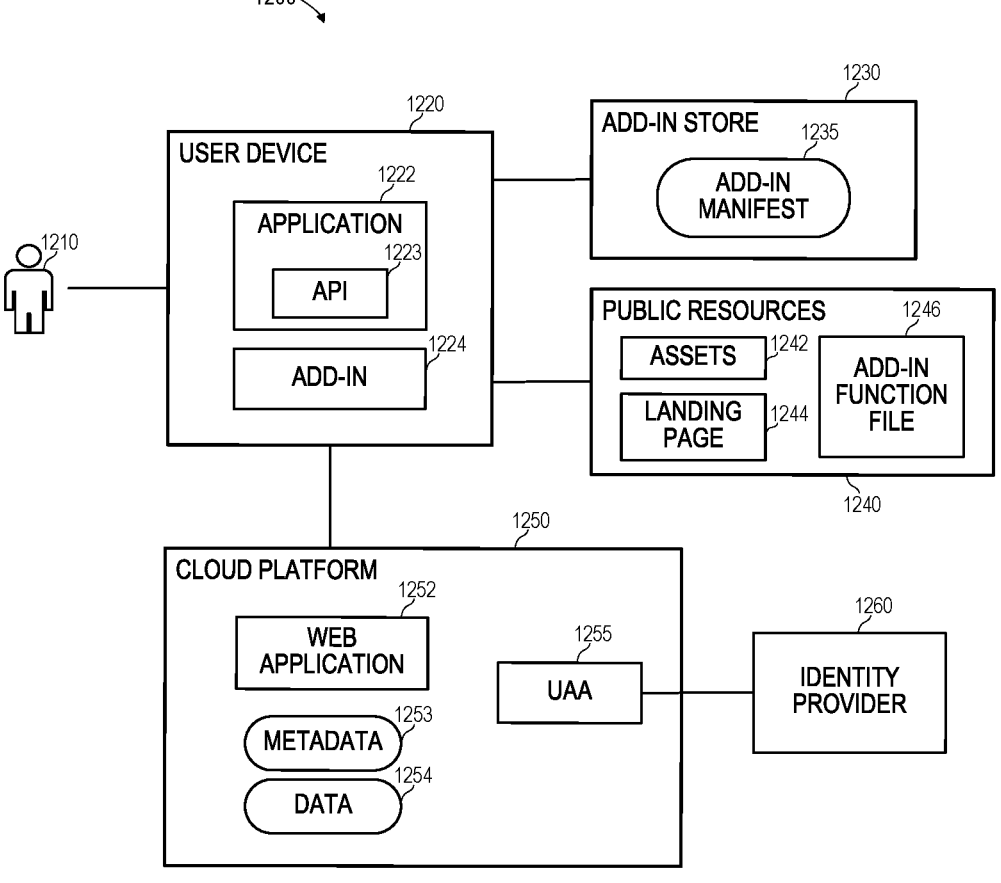
FIG. 12 is a block diagram of a system to efficiently determine values associated with a plurality of tuples of dimensions members according to some embodiments.

FIG. 12 is a block diagram of system 1200 to efficiently determine values associated with a plurality of tuples of dimensions members according to some embodiments. System 1200 may implement process 400 to provide a custom formula within a spreadsheet application which is not native to the spreadsheet application.

A provider of cloud platform 1250 may provide add-in 1224 that enables access to cloud platform data 1254 from within spreadsheet application 1222. Data 1254 conforms to metadata 1253. Metadata 1253 can include filter information, dimension information, etc., and the contents thereof may be unknown to application 1222 and add-in 1224.

Add-in 1224 can be implemented using public landing page 1244 and web application 1252 hosted by cloud platform 1250. Add-in 1224 may be deployed by providing manifest 1235 to add-in store 1230. Manifest 1235 can refer to public resources 1240, such as public assets 1242 (e.g., ribbon icons) and public landing page 1244.

In one example of operation, user 1210 operates user device 1220 to download add-in 1224 from add-in store 1230 to associate manifest 1235 with spreadsheet application 1222. Once user 1210 selects an icon or other UI element corresponding to add-in 1224, public landing page 1244 and other public resources 1240 referenced in manifest 1235 are loaded in add-in 1224. Add-in 1224 uses API 1223 to communicate with spreadsheet application 1222, such as to invoke functions of the spreadsheet application, including declaring and triggering execution of custom functions.

API 1223 may require custom functions to be defined in public landing page 1244. It may be desired to include, in add-in 1224, custom functions that can act on data 1254 which may be specific to a particular tenant of cloud platform 1250. However, tenant-specific data should not be accessible by landing page 1244 because landing page 1244 is public and does not require authentication. Accordingly, custom function code that accesses cloud platform data 1254 and/or metadata 1253 is not included in the public landing page 1244.

To solve the above technical limitation, a technical solution uses both public landing page 1244 and web application 1252. Public landing page 1244 can enable user 1210 to log in to a customer-specific tenant of cloud platform 1250 using UAA (User Account and Authentication) component 1255 and customer IDP (Identity Provider) 1260. Landing page 1244 can then redirect to web application 1252 upon successful authentication to cloud platform 1250.

Add-in function file 1246 is loaded with public landing page 1244 and includes custom function declarations and pseudo implementations. The pseudo-implementations can be invoked, for example, if a request is made to use a custom function before authentication to cloud platform 1250 has occurred. The pseudo implementation can include code to inform user 1210 that the custom function requires logging into the cloud platform 1250 before use.

Upon successful authentication to cloud platform 1250, the pseudo-implementations can be overwritten (e.g., using a global variable) with full function implementations that are included in web application 1252. The full function implementations can include, for example, functionality to retrieve data 1254, for example.

User 1210 can use custom functions (e.g., a GETDATA formula) when using the spreadsheet application 1222. When a custom function is invoked by spreadsheet application 1222, spreadsheet application 1222 can, using API 1223, invoke the full function implementation if the user has authenticated (e.g., and invoke the pseudo implementation if the user has not authenticated) to retrieve data 1254 specific to a tenant of cloud platform 1250.

Figure 13:
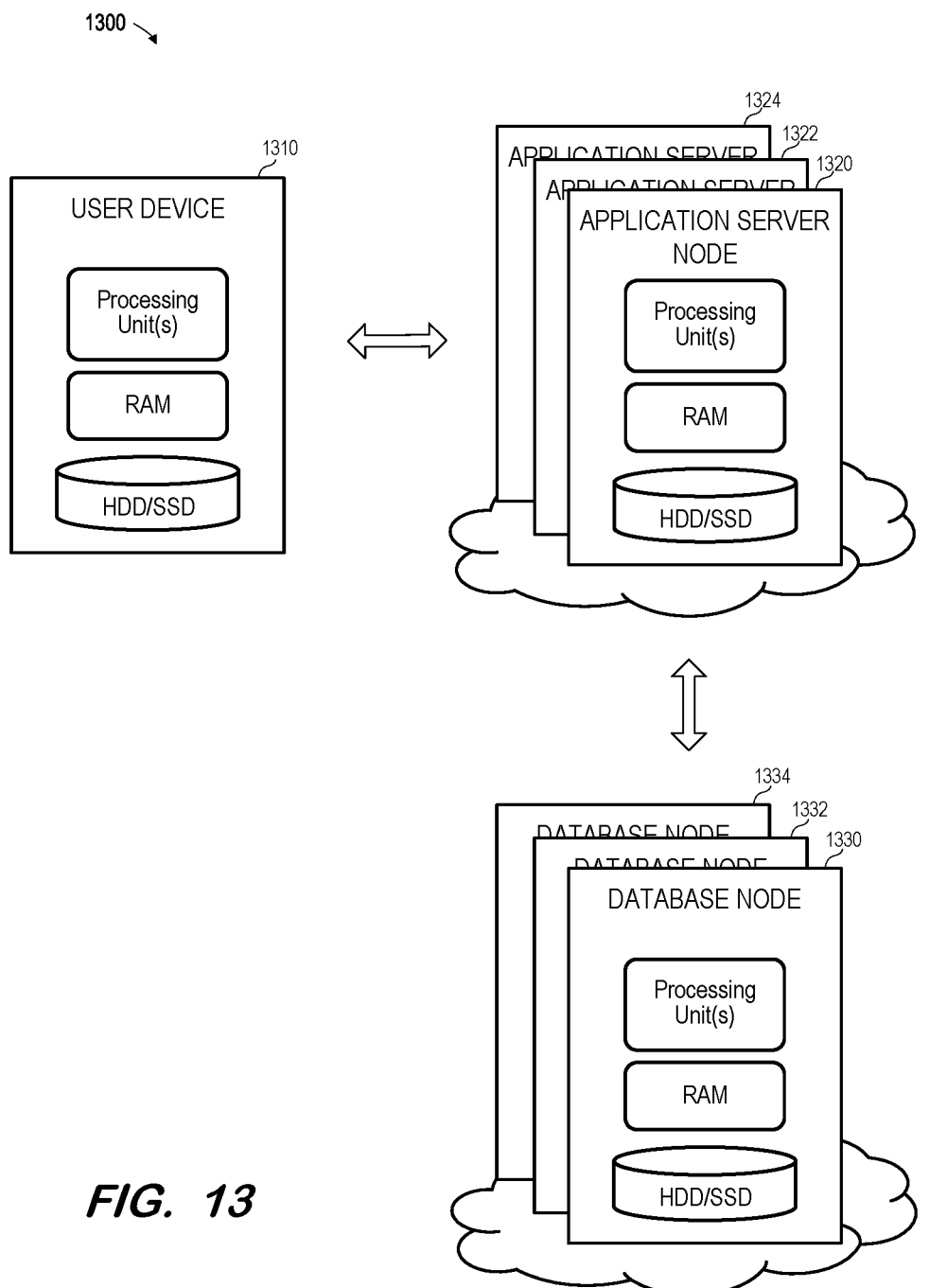
FIG. 13 is a block diagram of a cloud-based architecture implementing a system according to some embodiments.

FIG. 13 is a block diagram of cloud-based system 1300 according to some embodiments. Each of application server nodes 1320, 1322 and 1344 and database nodes 1330, 1332 and 1344 may comprise cloud-based compute resources, such as virtual machines, allocated by a public cloud provider providing self-service and immediate provisioning, autoscaling, security, compliance and identity management features.

A user may operate client device 1310 to interact with user interfaces of a service or application (such as a spreadsheet application) provided by one or more of application server nodes 1320, 1322 and 1324. The interactions may comprise requests to retrieve values associated with a plurality of dimension member tuples. In response to the request, a service or application of the one or more of application server nodes 1320, 1322 and 1324 may query one or more of database nodes 1330, 1332 and 1334 as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processing unit to execute program code such that the computing device operates as described herein.

All systems and processes discussed herein may be embodied in executable program code stored on one or more non-transitory computer-readable media. Such media may include, for example, a DVD-ROM, a Flash drive, magnetic tape, and solid-state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:

a storage device; and one or more processing units to execute executable program code stored on the storage device to cause the system to:

process a request received from a user for values associated with a plurality of tuples, each tuple including a plurality of dimension members;

generate and transmit a first query, based on the request, the first query including all dimension members of each of the plurality of tuples;

in response to the first query, receive a first result set including a value associated with each of a plurality of first result tuples;

determine a remaining set of tuples comprising a refinement of the plurality of tuples by excluding the plurality of first result tuples from the plurality of tuples;

generate and transmit a second query, based on the request and on remaining set of tuples, the second query including dimension members of the remaining set of tuples;

in response to the second query, receive a second result set including a value associated with each of a plurality of second result tuples;

determine, based on the second result set, that the values associated with the plurality of tuples have been received; and present the values associated with the plurality of tuples.

2. The system according to claim 1, wherein the request comprises a request for values associated with a second plurality of tuples including the plurality of tuples, and the one or more processing units to execute executable program code stored on the storage device to cause the system to:

determine that each of the plurality of tuples is associated with a first data source and a first set of dimensions;

determine a third plurality of tuples from the second plurality of tuples, each of the third plurality of tuples associated with the first data source and a second set of dimensions;

transmit a third query including all dimension members of each of the third plurality of tuples;

in response to the third query, receive a third result set including a value associated with each of a plurality of third result tuples;

determine a second remaining set of tuples based on the third plurality of tuples and the plurality of third result tuples;

transmit a fourth query including dimension members of the second remaining set of tuples;

in response to the fourth query, receive a fourth result set including a value associated with each of a plurality of fourth result tuples;

determine, based on the fourth result set, that the values associated with the third plurality of tuples have been received; and present the values associated with the third plurality of tuples.

3. The system according to claim 1, wherein the request comprises a request for values associated with a second plurality of tuples including the plurality of tuples, and the one or more processing units to execute executable program code stored on the storage device to cause the system to:

determine that each of the plurality of tuples is associated with a first data source and a first set of dimensions;

determine a third plurality of tuples from the second plurality of tuples, each of the third plurality of tuples associated with a second data source and a second set of dimensions;

transmit a third query including all dimension members of each of the third plurality of tuples;

in response to the third query, receive a third result set including a value associated with each of a plurality of third result tuples;

determine a second remaining set of tuples based on the third plurality of tuples and the plurality of third result tuples;

transmit a fourth query including dimension members of the second remaining set of tuples;

in response to the fourth query, receive a fourth result set including a value associated with each of a plurality of fourth result tuples;

determine, based on the fourth result set, that the values associated with the third plurality of tuples have been received; and present the values associated with the third plurality of tuples.

4. The system according to claim 1, wherein the second query comprises:

only one dimension member of a first hierarchical dimension and one or more dimension members of one or more other hierarchical dimensions of the remaining tuples which include the one dimension member of the first hierarchical dimension.

5. The system according to claim 4, wherein the second query further comprises all dimension members of non-hierarchical dimensions of the remaining tuples.

6. The system according to claim 4, wherein transmission of the second query including dimension members of the remaining set of tuples comprises:

determination of whether any of the remaining tuples include a dimension member of a first hierarchical dimension; and if it is determined that none of the remaining tuples include the dimension member of the first hierarchical dimension, generation of the second query to include all dimension members of each of the remaining tuples.

7. The system according to claim 6, wherein, if it is determined that the remaining tuples include the dimension member of the first hierarchical dimension, the second query is generated to include only the dimension member of the first hierarchical dimension and one or more dimension members of one or more other hierarchical dimensions of the remaining tuples which including the one dimension member of the first hierarchical dimension.

8. The system according to claim 7, wherein the second query further comprises all dimension members of non-hierarchical dimensions of the remaining tuples.

9. A method comprising:

processing a request received from a user for stored values associated with a plurality of tuples, each tuple including a plurality of dimension members of at least one hierarchical dimension;

generating and transmitting a first query, based on the request, the first query including all dimension members of each of the plurality of tuples to a system storing the values;

receiving from the system a first result set including a value associated with each of a plurality of first result tuples;

determining a remaining set of tuples comprising a refinement of the plurality of tuples by excluding the plurality of first result tuples from the plurality of tuples;

generating and transmitting to the system a second query, based on the request and on remaining set of tuples, the second query including dimension members of the remaining set of tuples;

receiving from the system a second result set including a value associated with each of a plurality of second result tuples;

determining, based on the second result set, that the values associated with the plurality of tuples have been received; and presenting the values associated with the plurality of tuples.

10. The method according to claim 9, wherein the request comprises a request for values associated with a second plurality of tuples including the plurality of tuples, the method further comprising:

determining that each of the plurality of tuples is associated with a first data source and a first set of dimensions;

determining a third plurality of tuples from the second plurality of tuples, each of the third plurality of tuples associated with the first data source and a second set of dimensions;

transmitting to the system a third query including all dimension members of each of the third plurality of tuples;

receiving from the system a third result set including a value associated with each of a plurality of third result tuples;

determining a second remaining set of tuples based on the third plurality of tuples and the plurality of third result tuples;

transmitting to the system a fourth query including dimension members of the second remaining set of tuples;

receiving from the system a fourth result set including a value associated with each of a plurality of fourth result tuples;

determining, based on the fourth result set, that the values associated with the third plurality of tuples have been received; and presenting the values associated with the third plurality of tuples.

11. The method according to claim 9, wherein the request comprises a request for values associated with a second plurality of tuples including the plurality of tuples, the method further comprising:

determining that each of the plurality of tuples is associated with a first data source and a first set of dimensions;

determining a third plurality of tuples from the second plurality of tuples, each of the third plurality of tuples associated with a second data source and a second set of dimensions;

transmitting to the system a third query including all dimension members of each of the third plurality of tuples;

receiving from the system a third result set including a value associated with each of a plurality of third result tuples;

determining a second remaining set of tuples based on the third plurality of tuples and the plurality of third result tuples;

transmitting a fourth query including dimension members of the second remaining set of tuples;

receiving a fourth result set including a value associated with each of a plurality of fourth result tuples;

determining, based on the fourth result set, that the values associated with the third plurality of tuples have been received; and presenting the values associated with the third plurality of tuples.

12. The method according to claim 9, wherein the second query comprises:

only one dimension member of a first hierarchical dimension and one or more dimension members of one or more other hierarchical dimensions of the remaining tuples which include the one dimension member of the first hierarchical dimension.

13. The method according to claim 12, wherein the second query further comprises all dimension members of non-hierarchical dimensions of the remaining tuples.

14. The method according to claim 12, wherein transmitting the second query including dimension members of the remaining set of tuples comprises:

determining whether any of the remaining tuples include a dimension member of a first hierarchical dimension; and if it is determined that none of the remaining tuples include the dimension member of the first hierarchical dimension, generating the second query to include all dimension members of each of the remaining tuples.

15. The method according to claim 14, wherein, if it is determined that the remaining tuples include the dimension member of the first hierarchical dimension, the second query is generated to include only the dimension member of the first hierarchical dimension and one or more dimension members of one or more other hierarchical dimensions of the remaining tuples which including the one dimension member of the first hierarchical dimension.

16. The method according to claim 15, wherein the second query further comprises all dimension members of non-hierarchical dimensions of the remaining tuples.

17. A non-transitory medium storing executable program code, the program code executable to cause a system to:

process a request received from a user for stored values associated with a plurality of tuples, each tuple including a plurality of dimension members of at least one hierarchical dimension;

generate and transmit a first query, based on the request, the first query including all dimension members of each of the plurality of tuples to a system storing the values;

receive from the system a first result set including a value associated with each of a plurality of first result tuples;

determine a remaining set of tuples comprising a refinement of the plurality of tuples by excluding the plurality of first result tuples from the plurality of tuples;

generate and transmit to the system a second query, based on the request and on remaining set of tuples, the second query including dimension members of the remaining set of tuples;

receive from the system a second result set including a value associated with each of a plurality of second result tuples;

determine, based on the second result set, that the values associated with the plurality of tuples have been received; and present the values associated with the plurality of tuples.

18. The medium according to claim 17, wherein the second query comprises:

only one dimension member of a first hierarchical dimension and one or more dimension members of one or more other hierarchical dimensions of the remaining tuples which include the one dimension member of the first hierarchical dimension.

19. The medium according to claim 18, wherein the second query further comprises all dimension members of non-hierarchical dimensions of the remaining tuples.

20. The medium according to claim 17, wherein transmission of the second query including dimension members of the remaining set of tuples comprises:

determination of whether any of the remaining tuples include a dimension member of a first hierarchical dimension;

if it is determined that none of the remaining tuples include the dimension member of the first hierarchical dimension, generating the second query to include all dimension members of each of the remaining tuple; and if it is determined that the remaining tuples include the dimension member of the first hierarchical dimension, generating the second query to include only the dimension member of the first hierarchical dimension and one or more dimension members of one or more other hierarchical dimensions of the remaining tuples which including the one dimension member of the first hierarchical dimension.

* * * * *